(12) United States Patent
Morimura

(10) Patent No.: US 11,306,816 B2
(45) Date of Patent: Apr. 19, 2022

(54) SHIFT DEVICE

(71) Applicant: KABUSHIKI KAISHA TOKAI-RIKA-DENKI-SEISAKUSHO, Aichi-ken (JP)

(72) Inventor: Kunihiro Morimura, Plymouth, MI (US)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 45 days.

(21) Appl. No.: 15/862,653

(22) Filed: Jan. 5, 2018

(65) Prior Publication Data
US 2019/0211916 A1 Jul. 11, 2019

(51) Int. Cl.
| F16H 59/10 | (2006.01) |
| F16H 59/02 | (2006.01) |
| F16H 61/24 | (2006.01) |
| F16H 61/22 | (2006.01) |

(52) U.S. Cl.
CPC ..... *F16H 59/0278* (2013.01); *F16H 59/0204* (2013.01); *F16H 59/10* (2013.01); *F16H 61/22* (2013.01); *F16H 61/24* (2013.01); *F16H 2059/0282* (2013.01); *F16H 2061/223* (2013.01); *F16H 2061/247* (2013.01)

(58) Field of Classification Search
CPC .... F16H 61/22; F16H 2061/223; F16H 61/16; F16H 59/0204; F16H 59/0278
USPC .......................................... 74/473.24, 473.21
See application file for complete search history.

(56) References Cited

U.S. PATENT DOCUMENTS

| 4,938,302 A * | 7/1990 | Schott ................... B60K 17/28 180/315 |
| 5,096,033 A * | 3/1992 | Osborn .................. F16H 59/10 192/220.7 |
| 5,293,763 A * | 3/1994 | Asano ............... B60R 25/02144 192/219.6 |
| 5,465,818 A * | 11/1995 | Osborn .................. F16H 59/10 192/220.4 |
| 6,325,196 B1 * | 12/2001 | Beattie ............... F16H 59/0204 192/220.4 |
| 6,679,809 B2 * | 1/2004 | Kato ...................... F16H 61/16 477/115 |

(Continued)

FOREIGN PATENT DOCUMENTS

WO    WO-2016167627 A1 * 10/2016 ............. B60K 28/10

*Primary Examiner* — Jake Cook
*Assistant Examiner* — Gregory Robert Weber
(74) *Attorney, Agent, or Firm* — Solaris Intellectual Property Group, PLLC

(57) ABSTRACT

In a shift device, when a lock lever is disposed at a restriction position or an intermediate position, a detent groove of a lever is abutted by the lock lever, and pivoting of the lever from a D position toward an S position, and pivoting of the lever from the S position toward the D position, is restricted. However, when the lever is disposed at the D position or the S position, by moving the lock lever to a permitted position, the detent groove does not abut the lock lever and so pivoting of the lever from the D position toward the S position and pivoting of the lever from the S position toward the D position is permitted. Thus, pivoting of the lever from the D position toward the S position and pivoting of the lever from the S position toward the D position can be restricted and permitted.

2 Claims, 5 Drawing Sheets

(56) References Cited

U.S. PATENT DOCUMENTS

| | | | |
|---|---|---|---|
| 6,783,480 B2* | 8/2004 | Masuda | F16H 59/10 |
| | | | 192/220.2 |
| 8,464,601 B2* | 6/2013 | Giefer | F16H 59/10 |
| | | | 74/473.12 |
| 8,978,504 B2* | 3/2015 | Morimura | F16H 61/22 |
| | | | 74/473.21 |
| 9,620,309 B2* | 4/2017 | Hoskins | F16H 59/08 |
| 9,851,002 B2* | 12/2017 | Hong | F16H 59/044 |
| 9,970,536 B2* | 5/2018 | Yamamura | F16H 61/18 |
| 10,088,040 B2* | 10/2018 | Mitteer | F16H 61/22 |
| 2004/0226801 A1* | 11/2004 | De Jonge | F16H 59/0204 |
| | | | 192/220.7 |
| 2012/0103122 A1 | 5/2012 | Morrissett | |
| 2015/0323064 A1* | 11/2015 | Yamamura | F16H 61/18 |
| | | | 74/473.21 |

* cited by examiner

SHIFT DEVICE

BACKGROUND

Technical Field

The present invention relates to a shift device in which a shift body is moved to change a shift position of the shift body.

Related Art

In a shift selector assembly described in US 2012/0103122 A1, when a release button of a shift lever is pressed such that a pawl pin of the shift lever is displaced, movement of the pawl pin is restricted by a plunger being in a restricted position, thereby restricting movement of the shift lever from a D position toward an L/M/S position, and movement of the pawl pin is permitted by the plunger being in a retracted position, thereby permitting movement of the shift lever from the D position toward the L/M/S position.

In such a shift selector assembly, it is preferable that movement of the shift lever from the D position toward the L/M/S position can be restricted and permitted, and movement of the shift lever from the L/M/S position toward the D position can be restricted and permitted.

SUMMARY

In consideration of the above circumstances, an object of the present invention is to obtain a shift device capable of restricting and permitting movement of a shift body from a first shift position toward a second shift position, and movement of the shift body from the second shift position toward the first shift position.

A shift device of a first aspect of the present invention includes: a shift body that is moved to change a shift position; and a restriction section that is operable from a first position to a second position and to a third position, movement of the shift body between a first shift position and a second shift position is restricted when the restriction section is disposed at the first position or the second position, and, that is disposed at the third position upon a predetermined condition being met when the shift body has been moved to the first shift position or the second shift position, so as to permit movement of the shift body between the first shift position and the second shift position.

In the shift device of the first aspect of the present invention, the shift body is moved to change the shift position of the shift body.

Movement of the shift body between the first shift position and the second shift position is restricted when the restriction section is disposed at the first position or the second position. Moreover, when the shift body has been moved to the first shift position or the second shift position, the restriction section is disposed at a third position upon a predetermined condition being met so as to permit movement of the shift body between the first shift position and the second shift position. Movement of the shift body from the first shift position to the second shift position, and movement of the shift body from the second shift position to the first shift position can thereby be restricted and permitted.

BRIEF DESCRIPTION OF THE DRAWINGS

Exemplary embodiments of the present invention will be described in detail based on the following figures, wherein.

DETAILED DESCRIPTION

Figure 1:
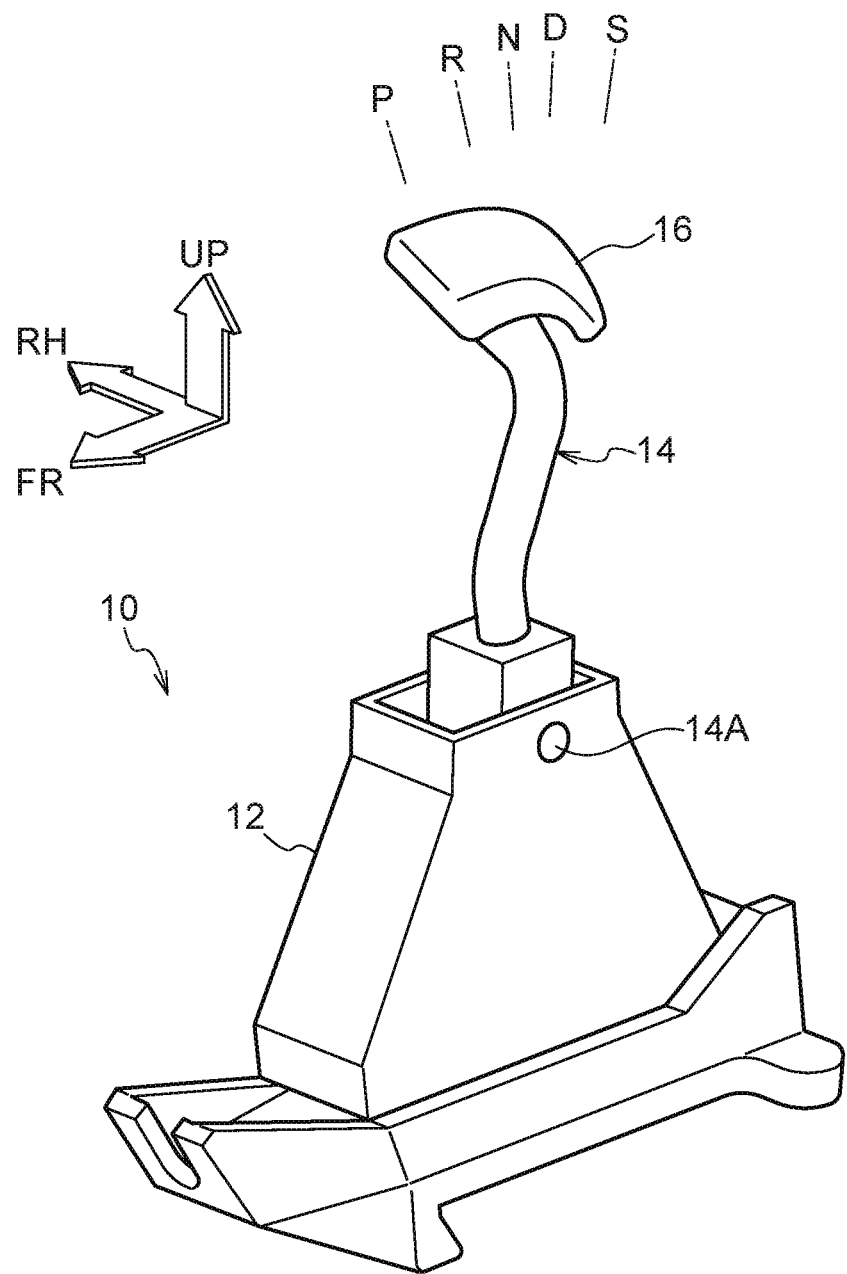
FIG. 1 is a perspective view illustrating a shift lever device according to an exemplary embodiment of the present invention, as viewed obliquely from the front left.
Figure 2:
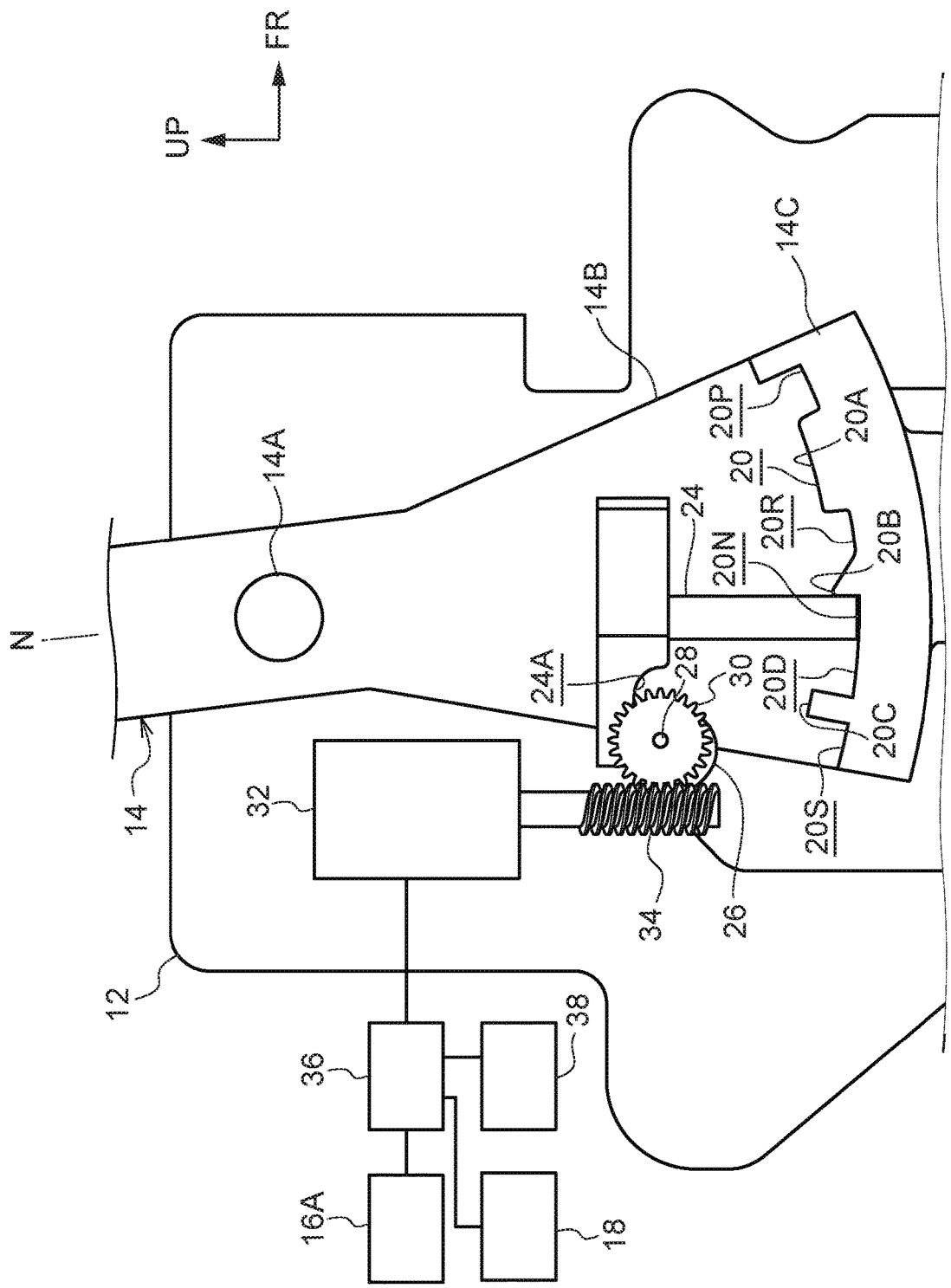
FIG. 2 is a side view illustrating relevant portions of the shift lever device according to the exemplary embodiment of the present invention, as viewed from the right.

FIG. 1 illustrates a shift lever device 10, serving as a shift device according to an exemplary embodiment of the present invention, in a perspective view as viewed obliquely from the front left. FIG. 2 illustrates a relevant portions of the shift lever device 10, in a side view as viewed from the right. Note that in the drawings, the arrow FR indicates the front of the shift lever device 10, the arrow RH indicates the right of the shift lever device 10, and the arrow UP indicates the upper side of the shift lever device 10.

The shift lever device 10 according to the present exemplary embodiment is what is called a straight shift device. The shift lever device 10 is a floor-mounted type installed to a floor section (vehicle-body side) of a vehicle cabin at a vehicle width direction inside of a driver seat (not illustrated in the drawings) of a vehicle (automobile). The front, right, and upper side of the shift lever device 10 respectively oriented toward the front, right, and upper side of the vehicle.

As illustrated in FIG. 1 and FIG. 2, the shift lever device 10 is provided with a substantially cuboidal-box shaped plate 12 (housing) made of resin and serving as an installation body. The plate 12 is fixed to the floor section of the vehicle cabin such that the shift lever device 10 is installed to the floor section of the vehicle cabin.

A substantially elongated rod shaped lever 14 serving as a shift body is disposed in the plate 12. An up-down direction intermediate section of the lever 14 is provided with a circular column shaped support shaft 14A, and the lever 14 is supported at an upper section of the plate 12 by the support shaft 14A such that the lever 14 is capable of pivoting (moving) in a front-rear direction within a predetermined range. The lever 14 extends from the plate 12 toward the upper side. The lever 14 extends inside the vehicle cabin.

A knob 16, serving as a grip section, is integrally provided at an upper end (leading end) of the lever 14. The lever 14 is capable of being pivot-operated in a state in which the knob 16 is gripped by an occupant (particularly the driver) of the vehicle. Accordingly, the shift lever 14 is capable of pivot-operation to a P position (a parking position), an R position (a reverse position), an N position (a neutral position), a D position (a drive position, a first shift position), and an S position (a sequential position, a second shift position), which serve as shift positions on progression from the front side to the rear side.

The knob 16 is provided with a button 16A (switch, see FIG. 2) serving as an operation section. The button 16A is capable of being operated (push-operated) by the occupant. A shift detection mechanism 18 (see FIG. 2) is provided inside the plate 12. The shift detection mechanism 18 detects the pivot position of the lever 14 to detect the shift position of the lever 14.

A pivot plate 14B having a substantially fan-shaped plate shape is provided at a lower section of the lever 14, and a lower face of the pivot plate 14B is curved following a pivot circumferential direction of the lever 14. A projection section 14C is integrally provided at a lower end of the pivot plate 14B. The projection 14C projects toward the right and extends along the pivot circumferential direction of the lever 14.

A detent groove 20 having a predetermined shape and serving as a catching section is formed in an upper face of the projection section 14C. The detent groove 20 is disposed across substantially the entire extension direction of the projection 14C. A P groove 20P is formed in a front end portion of the detent groove 20. A rear face of the P groove 20P is disposed substantially perpendicular to the pivot circumferential direction of the lever 14. A R groove 20R is formed in a front-rear direction intermediate portion of the detent groove 20. A front face of the R groove 20R is disposed substantially perpendicular to the pivot circumferential direction of the lever 14, and a rear face of the R groove 20R is inclined in a direction toward the upper side on progression toward the rear side. At the rear side of the R groove 20R, an N groove 20N is formed in the detent groove 20. A front face of the N groove 20N is disposed substantially perpendicular to the pivot circumferential direction of the lever 14. At a rear side of the N groove 20N, a D groove 20D is formed in the detent groove 20. The D groove 20D is in communication with the rear side of the N groove 20N. An S groove 20S is formed in a rear end portion (rear side of the D groove 20D) of the detent groove 20. A front face of the S groove 20S is disposed substantially perpendicular to the pivot circumferential direction of the lever 14

A lower face of the detent groove 20 (lower faces of the P groove 20P, the R groove 20R, the N groove 20N, the D groove 20D, and the S groove 20S) is configured by the same single curved face running along the pivot circumferential direction of the lever 14. In the detent groove 20, an upper face between the P groove 20P and the R groove 20R, an upper face between the R groove 20R and the N groove 20N, and an upper face between the D groove 20D and the S groove 20S are respectively configured by a PR face 20A, an RN face 20B, and a DS face 20C, and are curved following the pivot circumferential direction of the lever 14. The PR face 20A and the RN face 20B are configured by the same single curved face, and the DS face 20C is disposed further to the upper side (a pivot radial direction inside of the lever 14) than the PR face 20A and the RN face 20B.

Figure 3:
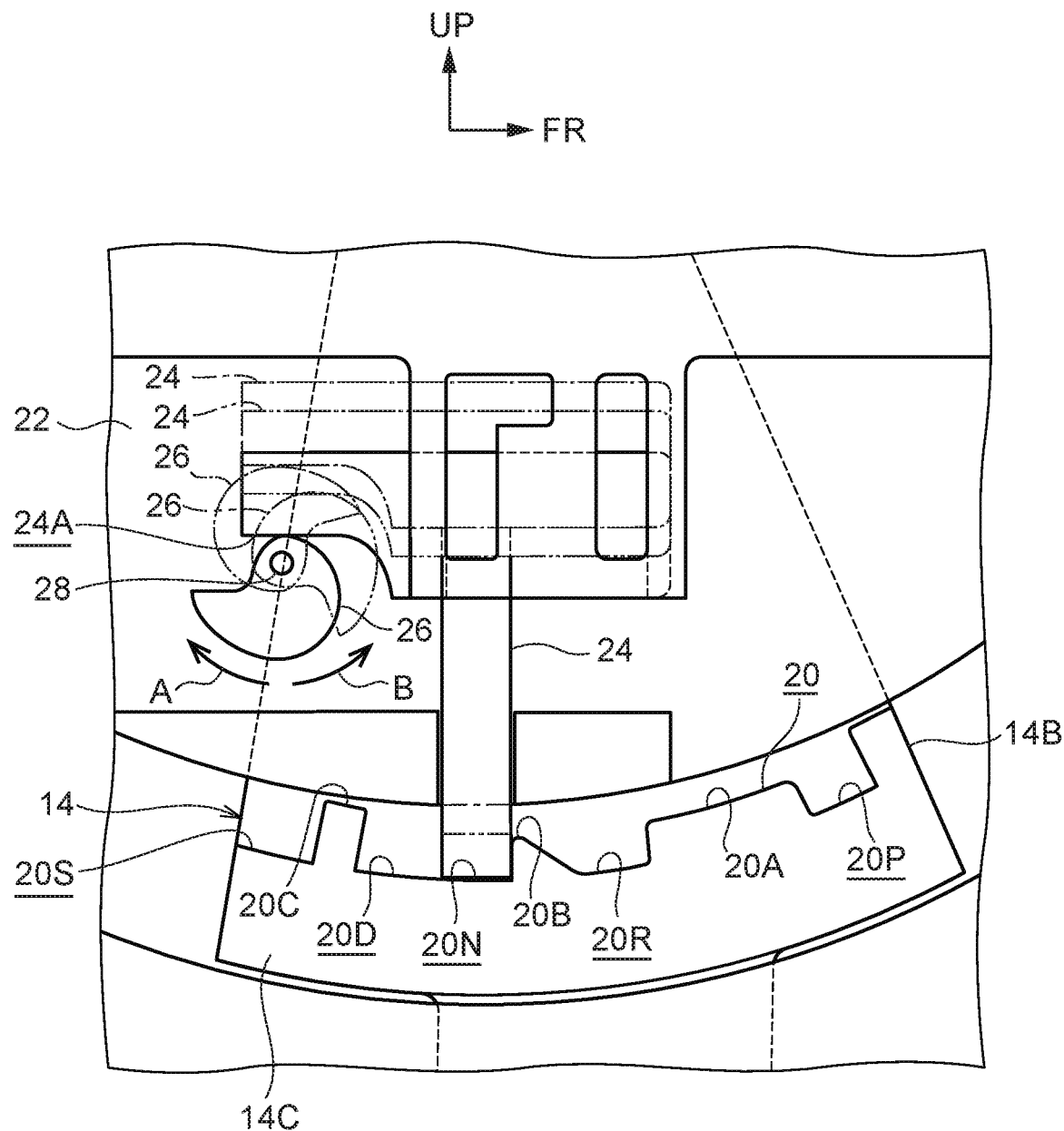
FIG. 3 is a side view illustrating a detent groove, a lock bar, and the like, of the shift lever device according to the exemplary embodiment of the present invention, as viewed from the right.

As illustrated in FIG. 3, a substantially flat-plate shaped support frame 22, serving as a support member, is fixed to the inside of the plate 12.

A substantially T-shaped plate shaped lock bar 24, serving as a restriction section, is supported by the support frame 22. The support frame 22 restricts movement of the lock bar 24 in the front-rear direction and in the left-right direction. The lock bar 24 is capable of moving within a predetermined range in the up-down direction guided by the support frame 22; the lock bar 24 is capable of being disposed at a restriction position (see the solid lines in FIG. 3), serving as a lower first position, an intermediate position (half stroke position, see the double-dotted dashed line in FIG. 3), serving as an up-down direction intermediate second position, and a permission position (full stroke position, see the single-dotted dashed line in FIG. 3), serving as an upper third position. A recess 24A with a substantially rectangular cross-section profile is formed in a rear portion of an upper portion of the lock bar 24, and the recess 24A is open at both left and right direction sides, the lower side, and the rear side.

Figure 4:
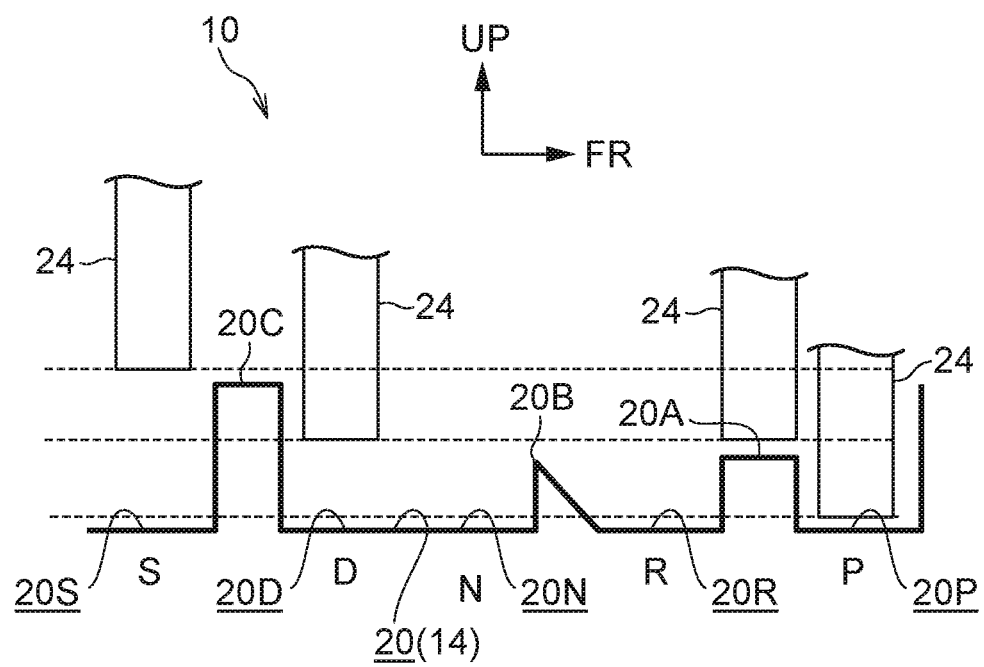
FIG. 4 is a schematic diagram illustrating the detent groove and the lock bar of the shift lever device according to the exemplary embodiment of the present invention.

A biasing member (not illustrated in the drawings) spans between the support frame 22 and the lock bar 24. The biasing member biases the lock bar 24 toward the lower side. Thus, when the lever 14 is disposed in the P position, the R position, the N position, the D position, or the S position, the lock bar 24 is disposed at the restriction position due to biasing force from the biasing member, and a lower end portion of the lock bar 24 is inserted into the respective P groove 20P, the R groove 20R, the N groove 20N, the D groove 20D, or the S groove 20S of the detent groove 20 of the lever 14 (see FIG. 4 and the solid lines in FIG. 3). The lock bar 24 is disposed at an upper side (a pivot radial direction inside of the lever 14) of the PR face 20A and the RN face 20B of the detent groove 20 yet at a lower side (a pivot radial direction outside of the lever 14) of the DS face 20C of the detent groove 20 when the lock bar 24 is moved to the intermediate position against the biasing force of the biasing member (see FIG. 4 and the double-dotted dashed line in FIG. 3). The lock bar 24 is disposed at an upper side (pivot radial direction inside of the lever 14) of the DS face 20C of the detent groove 20 when the lock bar 24 is moved to the permission position against the biasing force of the biasing member, (see FIG. 4 and the single-dotted dashed line in FIG. 3).

A substantially flat-plate shaped cam 26, serving as a rotation section, is disposed at a lower side of an upper face of the recess 24A of the lock bar 24, and a rotation shaft 28 penetrates through the cam 26 so as to be capable of rotating as a unit with the cam 26. The rotation shaft 28 spans between the support frame 22 and a right wall of the plate 12, and is disposed parallel to the left-right direction. The cam 26 is capable of rotating in the restriction direction A and the permission direction B in FIG. 3 about the rotation shaft 28. The rotation radius dimension of the cam 26 is set to gradually increase on progression toward the restriction direction A, and the cam 26 is disposed at a rotation position on the restriction direction A side.

As illustrated in FIG. 2, at the right side of the cam 26, the rotation shaft 28 coaxially penetrates a gear 30 (worm wheel), and the gear 30 is capable of rotating as a unit with the rotation shaft 28.

At an upper rear side of the gear 30, a motor 32, serving as a drive mechanism, is disposed inside the plate 12. The motor 32 is fixed to the right wall of the plate 12. An output shaft of the motor 32 extends downward, and a worm 34 is coaxially fixed to the output shaft of the motor 32. The gear 30 meshes with the worm 34, and the motor 32 is driven so as to rotate the worm 34 as a unit with the output shaft of the motor 32. Accordingly, the gear 30 is rotated at a reduced speed, and the rotation shaft 28 and the cam 26 rotate as a unit with the gear 30.

The motor 32 is electrically connected to a control device 36, and the motor 32 is driven in one direction or another direction under control of the control device 36. A vehicle brake 38 is electrically connected to the control device 36, and the occupant engages the brake 38 to brake the vehicle.

The button 16A and the shift detection mechanism 18 are also electrically connected to the control device 36.

Next, explanation follows regarding operation of the present exemplary embodiment.

In the shift lever device 10 configured as described above, the lock bar 24 is disposed in the restriction position due to the biasing force of the biasing member, and the lower end portion of the lock bar 24 is inserted into the respective P groove 20P, the R groove 20R, the N groove 20N, the D groove 20D, or the S groove 20S of the detent groove 20 of the lever 14 (the projection 14C of the pivot plate 14B) when the lever 14 is disposed in the P position, the R position, the N position, the D position, or the S position.

As described later, when the button 16A of the knob 16 is operated and the motor 32 is driven in the one direction under control of the control device 36, the output shaft of the motor 32, the worm 34, the gear 30, and the rotation shaft 28 are rotated and the cam 26 is rotated in the permission direction B. The lock bar 24 is thereby moved from the restriction position to either the intermediate position or the permission position against the biasing force of the biasing member. When operation of the button 16A of the knob 16 has been released, the motor 32 is then driven in the other direction under control of the control device 36 so as to rotate the output shaft of the motor 32, the worm 34, the gear 30, and the rotation shaft 28. The cam 26 is thus rotated in the restriction direction A, and the lock bar 24 moved from the intermediate position or the permission position downward under the biasing force of the biasing member. Thus, the lock bar 24 is disposed in the restriction position, and the lower end portion of the lock bar 24 is inserted into the respective P groove 20P, the R groove 20R, the N groove 20N, the D groove 20D, or the S groove 20S when the lever 14 is disposed in the P position, the R position, the N position, the D position, or the S position.

In cases in which the lever 14 is disposed at the P position (in cases in which the shift detection mechanism 18 detects that the lever 14 is disposed at the P position) while the button 16A of the knob 16 is not being operated in a state in which the brake 38 has been engaged, the lock bar 24 is disposed at the restriction position and the lower end portion of the lock bar 24 is kept in a state inserted in the P groove 20P. Thus, when the lever 14 is pivot-operated toward the rear side from the P position and the detent groove 20 is pivoted toward the front side, the rear face of the P groove 20P abuts the lower end portion of the lock bar 24 and pivoting of the detent groove 20 toward the front side is caught by the lock bar 24. This restricts (locks) the lever 14 from being pivot-operated from the P position toward the R position.

On the other hand, in cases in which the lever 14 is disposed at the P position (in cases in which the shift detection mechanism 18 detects that the lever 14 is disposed at the P position), when the button 16A of the knob 16 is operated in a state in which the brake 38 has been engaged, the motor 32 is driven in the one direction under control of the control device 36 so as to rotate the cam 26 in the permission direction B. The lock bar 24 thereby moves to the intermediate position against the biasing force of the biasing member, and the lower end portion of the lock bar 24 is disposed at the upper side of the PR face 20A and the RN face 20B of the detent groove 20 yet at the lower side of the DS face 20C of the detent groove 20. Thus, when the lever 14 is pivot-operated from the P position toward the rear side and the detent groove 20 is pivoted toward the front side, the rear face of the P groove 20P does not abut against the lower end portion of the lock bar 24 although the rear face of the D groove 20D does abut against the lower end portion of the lock bar 24. Thus, when the lever 14 is pivot-operated from the P position toward the D position, pivoting of the detent groove 20 toward the front side is not caught by the lock bar 24 and so pivot-operation of the lever 14 from the P position to the D position is permitted, and when the lever 14 is pivot-operated from the D position toward the S position, pivoting of the detent groove 20 toward the front side is caught by the lock bar 24 and so pivot-operation of the lever 14 from the D position toward the S position is restricted.

In cases in which the lever 14 is disposed at the R position (in cases in which the shift detection mechanism 18 detects that the lever 14 is disposed at the R position) while the button 16A of the knob 16 is not being operated, the lock bar 24 is disposed at the restriction position and the lower end portion of the lock bar 24 is kept in a state inserted in the R groove 20R. Thus, when the lever 14 is pivot-operated from the R position toward the front side and the detent groove 20 is pivoted toward the rear side, the front face of the R groove 20R is abutted against the lower end portion of the lock bar 24 and pivoting of the detent groove 20 toward the rear side is caught by the lock bar 24. This restricts the lever 14 from being pivot-operated from the R position toward the P position.

Further, when the lever 14 is pivot-operated from the R position toward the rear side and the detent groove 20 is pivoted toward the front side, the lock bar 24 is moved by the rear face of the R groove 20R toward the upper side against the biasing force of the biasing member and then the lever 14 is pivot-operated toward the N position such that the N groove 20N reaches the lock bar 24. The lock bar 24 is accordingly moved downward under biasing force of the biasing member, disposing the lock bar 24 in the restriction position (the lower end portion of the lock bar 24 is inserted into the N groove 20N).

In cases in which the lever 14 is disposed at the N position (in cases in which the shift detection mechanism 18 detects that the lever 14 is disposed at the N position) while the button 16A of the knob 16 is not being operated, the lock bar 24 is disposed at the restriction position and the lower end portion of the lock bar 24 is kept in a state inserted in the N groove 20N. Thus, when the lever 14 is pivot-operated from the N position toward the front side and the detent groove 20 is pivoted toward the rear side, the front face of the N groove 20N is abutted against the lower end portion of the lock bar 24 and pivoting of the detent groove 20 toward the rear side is caught by the lock bar 24. This restricts the lever 14 from being pivot-operated from the N position toward the R position.

Further, when the lever 14 is pivot-operated from the N position toward the rear side and the detent groove 20 is pivoted toward the front side, the portion of the detent groove 20 from the N groove 20N to the D groove 20D passes by the lower end portion of the lock bar 24 in a state in which the lock bar 24 is disposed in the restriction position. The lever 14 is accordingly pivot-operated from the N position to the D position.

On the other hand, in cases in which the lever 14 is disposed at either the R position or the N position (in cases in which the shift detection mechanism 18 detects that the lever 14 is disposed at either the R position or the N position), when the button 16A of the knob 16 is operated, the motor 32 is driven in the one direction under control of the control device 36 so as to rotate the cam 26 in the permission direction B. The lock bar 24 thereby moves to the intermediate position against the biasing force of the biasing member, and the lower end portion of the lock bar 24 is disposed at the upper side of the PR face 20A and the RN face 20B of the detent groove 20 yet at the lower side of the DS face 20C of the detent groove 20. Thus, when the lever 14 is pivot-operated from either the R position or the N position and the detent groove 20 is pivoted, the front face of the R groove 20R and the front face of the N groove 20N do not abut against the lower end portion of the lock bar 24 although the rear face of the D groove 20D does abut against the lower end portion of the lock bar 24. Thus, when the lever 14 is pivot-operated from either the R position or the N position to the P position or the D position, pivoting of the detent groove 20 is not caught by the lock bar 24 and so pivot-operation of the lever 14 from either the R position or the N position to the P position or the D position is permitted, and when the lever 14 is pivot-operated from the D position toward the S position, pivoting of the detent groove 20 toward the front side is caught by the lock bar 24 and so pivot-operation of the lever 14 from the D position toward the S position is restricted.

In cases in which the lever 14 is disposed at the D position (in cases in which the shift detection mechanism 18 detects that the lever 14 is disposed at the D position) while the button 16A of the knob 16 is not being operated, the lock bar 24 is disposed at the restriction position and the lower end portion of the lock bar 24 is kept in a state inserted in the D groove 20D. Thus, when the lever 14 is pivot-operated from the D position toward the rear side and the detent groove 20 is pivoted toward the front side, the rear face of the D groove 20D is abutted against the lower end portion of the lock bar 24 and pivoting of the detent groove 20 toward the front side is caught by the lock bar 24. This restricts the lever 14 from being pivot-operated from the D position to the S position.

Further, when the lever 14 is pivot-operated from the D position toward the front side and the detent groove 20 is pivoted toward the rear side, the portion of the detent groove 20 from the D groove 20D to the N groove 20N passes by the lower end portion of the lock bar 24 in a state in which lock bar 24 is disposed in the restriction position. The lever 14 is accordingly pivot-operated from the D position to the N position.

On the other hand, in cases in which the lever 14 is disposed at the D position (in cases in which the shift detection mechanism 18 detects that the lever 14 is disposed at the D position), when the button 16A of the knob 16 is operated, the motor 32 is driven in the one direction under control of the control device 36 so as to rotate the cam 26 in the permission direction B. The lock bar 24 thereby moves to the permission position against the biasing force of the biasing member, and the lower end portion of the lock bar 24 is disposed at the upper side of the DS face 20C of the detent groove 20. Thus, when the lever 14 is pivot-operated from the D position and the detent groove 20 is pivoted, the front face of the R groove 20R, the front face of the N groove 20N, and the rear face of the D groove 20D do not abut against the lower end portion of the lock bar 24. Thus, when the lever 14 is pivot-operated from the D position toward the P position or the S position, pivoting of the detent groove 20 is not caught by the lock bar 24 and so pivot-operation of the lever 14 from the D position toward the P position or the S position is permitted.

In cases in which the lever 14 is disposed at the S position (in cases in which the shift detection mechanism 18 detects that the lever 14 is disposed at the S position) while the button 16A of the knob 16 is not being operated, the lock bar 24 is disposed at the restriction position and the lower end portion of the lock bar 24 is kept in a state inserted in the S groove 20S. Thus, when the lever 14 is pivot-operated from the S position toward the front side and the detent groove 20 is pivoted toward the rear side, the front face of the S groove 20S is abutted against the lower end portion of the lock bar 24 and pivoting of the detent groove 20 toward the rear side is caught by the lock bar 24. This restricts the lever 14 from being pivot-operated from the S position to the D position.

On the other hand, in cases in which the lever 14 is disposed at the S position (in cases in which the shift detection mechanism 18 detects that the lever 14 is disposed at the S position), when the button 16A of the knob 16 is operated, the motor 32 is driven in the one direction under control of the control device 36 so as to rotate the cam 26 in the permission direction B. The lock bar 24 thereby moves to the permission position against the biasing force of the biasing member, and the lower end portion of the lock bar 24 is disposed at the upper side of the DS face 20C of the detent groove 20. Thus, when the lever 14 is pivot-operated from the S position toward the front side and the detent groove 20 is pivoted toward the rear side, the front face of the R groove 20R, the front face of the N groove 20N, and the front face of the S groove 20S do not abut against the lower end portion of the lock bar 24. Thus, when the lever 14 is pivot-operated from the S position to the P position, pivoting of the detent groove 20 toward the rear side is not caught by the lock bar 24 and so pivot-operation of the lever 14 from the S position to the P position is permitted.

Note that when the lock bar 24 is disposed in the restriction position or in the intermediate position, the rear face of the D groove 20D of the detent groove 20 of the lever 14 is abutted against the lower end portion of the lock bar 24, and so pivoting of the lever 14 from the D position toward the S position is restricted. However, by moving the lock bar 24 to the permission position when the lever 14 is disposed at the D position, the rear face of the D groove 20D does not abut against the lower end portion of the lock bar 24 and pivoting of the lever 14 from the D position toward the S position is permitted. Moreover, pivoting of the lever 14 from the S position toward the D position is restricted when the lock bar 24 is disposed at the restriction position as a result of the front face of the S groove 20S of the detent groove 20 being abutted against the lower end portion of the lock bar 24. However, by moving the lock bar 24 to the permission position when the lever 14 is disposed at the S position, the front face of the S groove 20S does not abut against the lower end portion of the lock bar 24 and pivoting of the lever 14 from the S position toward the D position is permitted. This enables not only pivoting of the lever 14 from the D position toward the S position to be restricted and permitted, but also enables pivoting of the lever 14 from the S position toward the D position to be restricted and permitted, thereby enabling unnecessary pivoting of the lever 14 from the S position toward the D position to be suppressed.

Moreover, simply configuring the lock bar 24 so as to be capable of being disposed in the permission position in addition to the restriction position and the intermediate position enables both pivoting of the lever 14 from the D position toward the S position and pivoting of the lever 14 from the S position toward the D position to be restricted and suppressed. Pivoting of the lever 14 from the D position toward the S position, and pivoting of the lever 14 from the S position toward the D position can thereby be restricted and permitted with a simple configuration.

Note that in the present exemplary embodiment, in cases in which the lever 14 is disposed at the D position or the S position, the lock bar 24 is moved to the permission position by operating the button 16A of the knob 16. However, when the lever 14 is disposed at least at one of the D position or the S position, configuration may be such that the lock bar 24 is moved to the permission position when the speed of the vehicle reaches a predetermined speed.

First Modified Example

Figure 5A:
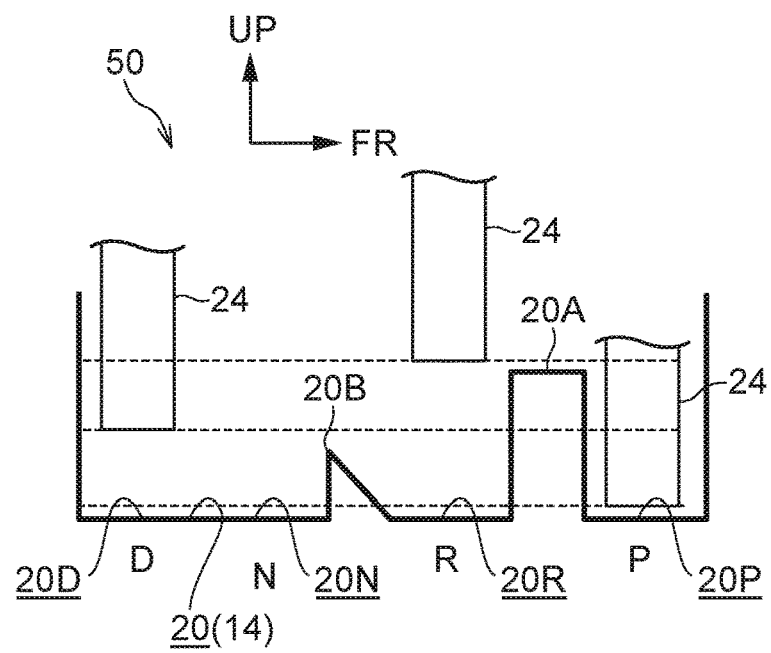
FIG. 5A is a schematic diagram illustrating a detent groove and a lock bar of a shift lever device according to a first modified example of the exemplary embodiment of the present invention.

FIG. 5A illustrates a detent groove 20 and a lock bar 24 of a shift lever device 50, serving as a shift device according to a first modified example of the present exemplary embodiment, in a schematic view.

As illustrated in FIG. 5A, in the shift lever device 50 according to the first modified example, a lever 14 is capable of pivot-operation to a P position (a first shift position), an R position (a second shift position), an N position, and a D position, on progression from the front side to the rear side. In the detent groove 20 of the lever 14, an S groove 20S and a DS face 20C are not provided, and a PR face 20A is disposed further to the upper side (pivot radial direction inside of the lever 14) than an RN face 20B.

In cases in which the lever 14 is disposed at the P position (in cases in which a shift detection mechanism 18 detects that the lever 14 is disposed at the P position), when a button 16A of a knob 16 is operated in a state in which the brake 38 is engaged, a motor 32 is driven in one direction under control of a control device 36 so as to rotate a cam 26 in a permission direction B. A lock bar 24 thereby moves to a permission position against the biasing force of a biasing member, and a lower end portion of the lock bar 24 is disposed at the upper side of the PR face 20A and RN face 20B of the detent groove 20. Thus, when the lever 14 is pivot-operated from the P position toward the rear side and the detent groove 20 is pivoted toward the front side, a rear face of the P groove 20P does not abut against the lower end portion of the lock bar 24. Thus, when the lever 14 is pivot-operated from P position to the D position, pivoting of the detent groove 20 toward the front side is not caught by the lock bar 24 and so pivot-operation of the lever 14 from the P position toward the D position is permitted.

In cases in which the lever 14 is disposed at the N position or the D position (in cases in which a shift detection mechanism 18 detects that the lever 14 is disposed at the N position or the D position), when the button 16A of the knob 16 is operated, the motor 32 is driven in the one direction under control of the control device 36 so as to rotate the cam 26 in the permission direction B. The lock bar 24 thereby moves to an intermediate position against the biasing force of the biasing member, and a lower end portion of the lock bar 24 is disposed at the upper side of the RN face 20B of the detent groove 20 yet at the lower side of the PR face 20A of the detent groove 20. Thus, when the lever 14 is pivot-operated from the N position or the D position and the detent groove 20 is pivoted, a front face of the N groove 20N does not abut against the lower end portion of the lock bar 24 although a front face of the R groove 20R does abut against the lower end portion of the lock bar 24. Thus, when the lever 14 is pivot-operated from either the N position or the D position to the R position or the D position, pivoting of the detent groove 20 is not caught by the lock bar 24 and so pivot-operation of the lever 14 from either the N position or the D position to the R position or the D position is permitted, and when the lever 14 is pivot-operated from the R position toward the P position, pivoting of the detent groove 20 toward the rear side is caught by the lock bar 24 and so pivot-operation of the lever 14 from the R position toward the P position is restricted.

Moreover, in cases in which the lever 14 is disposed at the R position (in cases in which a shift detection mechanism 18 detects that the lever 14 is disposed at the R position), when the button 16A of the knob 16 is operated, the motor 32 is driven in the one direction under control of the control device 36 so as to rotate the cam 26 in the permission direction B. The lock bar 24 thereby moves to the permission position against the biasing force of the biasing member, and a lower end portion of the lock bar 24 is disposed at the upper side of the PR face 20A of the detent groove 20. Thus, when the lever 14 is pivot-operated from the R position and the detent groove 20 is pivoted, a front face of the R groove 20R does not abut against the lower end portion of the lock bar 24. Thus, when the lever 14 is pivot-operated from the R position to the P position or the D position, pivoting of the detent groove 20 is not caught by the lock bar 24 and so pivot-operation of the lever 14 R position to the P position or the D position is permitted.

Note that when the lock bar 24 is disposed in the restriction position or in the intermediate position, the front face of the R groove 20R of the detent groove 20 of the lever 14 is abutted against the lower end portion of the lock bar 24, and so pivoting of the lever 14 from the R position toward the P position is restricted. However, by moving the lock bar 24 to the permission position when the lever 14 is disposed at the R position, the front face of the R groove 20R does not abut against the lower end portion of the lock bar 24 and pivoting of the lever 14 from the R position toward the P position is permitted. Moreover, pivoting of the lever 14 from the P position toward the R position is restricted when the lock bar 24 is disposed at the restriction position as a result of the rear face of the P groove 20P of the detent groove 20 being abutted against the lower end portion of the lock bar 24. However, by moving the lock bar 24 to the permission position when the lever 14 is disposed at the P position, the rear face of the P groove 20P does not abut against the lower end portion of the lock bar 24 and pivoting of the lever 14 from the P position toward the R position is permitted.

The first modified example is thus able to exhibit similar operation and advantageous effects to that of the exemplary embodiment described above.

Second Modified Example

Figure 5B:
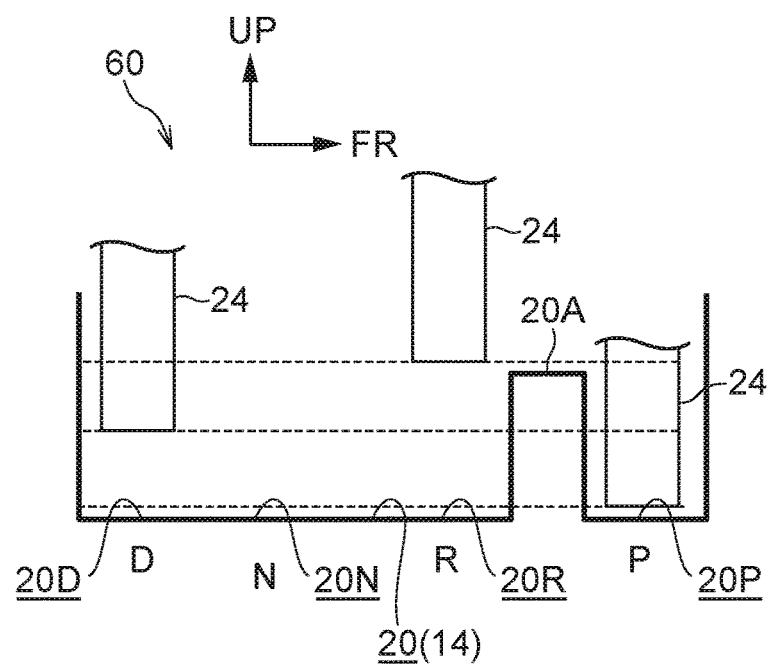
FIG. 5B is a schematic diagram illustrating a detent groove and a lock bar of a shift lever device according to a second modified example of the exemplary embodiment of the present invention.

FIG. 5B illustrates a detent groove 20 and a lock bar 24 of a shift lever device 60, serving as a shift device according to a second modified example of the present exemplary embodiment, in a schematic view.

The shift lever device 60 according to the second modified example is substantially similar to the shift device of the first modified example described above, but differs in the following points.

As illustrated in FIG. 5B, in the shift lever device 60 according to the second modified example, a RN face 20B is not provided at the detent groove 20 of a lever 14, and in the detent groove 20, a N groove 20N is in communication with a rear side of the R groove 20R.

Note that when the lever 14 is pivot-operated from the R position toward the rear side and the detent groove 20 is pivoted toward the front side, a portion of the detent groove 20 from the R groove 20R to the N groove 20N passes by a lower end of a lock bar 24 in a state in which the lock bar 24 is disposed in a restriction position such that the lever 14 is pivot-operated from the R position toward the N position.

Further, when the lever 14 is pivot-operated from the N position toward the front side and the detent groove 20 is pivoted toward the rear side, a portion of the detent groove 20 from the N groove 20N to the R groove 20R passes by the lower end of the lock bar 24 in a state in which the lock bar 24 is disposed in a restriction position such that the lever 14 is pivot-operated from the N position toward the R position.

The second modified example is thus able to exhibit similar operation and advantageous effects to that of the first modified example described above.

Note that in the first modified example and the second modified example described above, in cases in which the lever 14 is disposed at the P position, the lock bar 24 is moved to the permission position when a button 16A of a knob 16 is operated in a state in which a brake 38 has been engaged. However, in cases in which the lever 14 is disposed at the P position, configuration may be such that the lock bar 24 is moved to the permission position either when the brake 38 is engaged or when the button 16A of the knob 16 is operated.

Moreover, in the first modified example and the second modified example described above, in cases in which the lever 14 is disposed at the R position, the lock bar 24 is moved to the permission position by operating the button 16A of the knob 16. However, in cases in which the lever 14 is disposed at the R position, configuration may be such that the lock bar 24 is moved to the permission position either when the brake 38 is engaged, or when the button 16A of the knob 16 is operated in a state in which the brake 38 has been operated.

Further, in the above exemplary embodiments (including the first modified example and the second modified example), the detent groove 20 is provided at the lever 14, and the lock bar 24 (including the motor 32 and the like) is provided at the vehicle-body side (the plate 12 and the support frame 22). However, configuration may be made in which the lock bar 24 (including the motor 32 and the like) is provided at the lever 14, and the detent groove 20 is provided at the vehicle-body side (at least one out of the plate 12 or the support frame 22).

Moreover, in the above exemplary embodiments (including the first modified example and the second modified example), the lever 14 (shift body) is capable of pivoting. However, the shift body may be configured so as to be capable of rotating or so as to be capable of sliding.

Further, in the above exemplary embodiments (including the first modified example and the second modified example), the shift lever device 10, 50, 60 is a floor-mounted type installed to the floor section of the vehicle cabin. However, the shift lever device 10, 50, 60 may be installed to a console, a column cover, or an instrument panel of the vehicle cabin.

What is claimed is:

1. A shift device comprising:
    a shift body that is moved to change a shift position, a second shift position being disposed immediately next to a first shift position, an N position being disposed immediately next to the first shift position or the second shift position; and
    a restriction section that is operable from a first position to a second position and from the second position to a third position, that is operated from the first position to the second position upon a predetermined condition being met and upon the shift body having been disposed at the N position, movement of the shift body from the N position to an R position and from the R position to a P position is unimpeded by the restriction section when the restriction section is disposed at the second position, the movement of the shift body between the first shift position and the second shift position is restricted when the restriction section is disposed at the second position, and, that is disposed at the third position upon the predetermined condition being met and upon the shift body having been disposed at the first shift position or the second shift position, so as to permit movement of the shift body between the first shift position and the second shift position; wherein
    the N position corresponds to a neutral shift position of a vehicle, the R position corresponds to a reverse shift position of the vehicle, and the P position corresponds to a park shift position of the vehicle.

2. The shift device of claim 1, wherein the predetermined condition is operation of an operation section provided at the shift body.

* * * * *